United States Patent Office 3,160,662
Patented Dec. 8, 1964

3,160,662
LOWER ALKYLAMINOACYL AMIDE ANESTHETICS
Nils Magnus Lofgren, Lidingo, and Claes Philip Tegner, Sodertalje, Sweden, assignors to Aktiebolaget Astra, Apotekarnes Kemiska Fabriker, Sodertalje, Sweden, a company of Sweden
No Drawing. Filed June 24, 1958, Ser. No. 744,052
Claims priority, application Sweden June 26, 1957
9 Claims. (Cl. 260—562)

This invention is that of alpha-(lower)monoalkylaminopropionyl-ortho-toluidides wherein the alkyl group has three carbon atoms (i.e. propyl or isopropyl) and their therapeutically innocuous acid addition salts. These substances are unusually effective local anesthetics showing an advantageously good therapeutic index.

The expression "therapeutically innocuous" is the recognized synonym for the expression "pharmaceutically acceptable" commonly used to designate a substance which is physiologically innocuous when taken in a dosage and at a regimen (i.e. frequency of administration) that is effective for its indicated therapeutic use.

Thus, the therapeutically innocuous acid addition salts of the toluidides of the invention are, for example, those of a mineral acid such as a hydrohalide as the hydrochloride or hydrobromide, the phosphate, or sulfate; or of an aliphatic acid such as a mono-, di-, or tri-carboxylic acid as the acetate, citrate, fumarate, glycolate, lactate, levulinate, maleate, succinate, or tartrate; or of an aliphatic sulfonic acid as the methane-sulfonate.

Publications by Erdtman and Löfgren (Svensk Kemisk Tidskrift, 49, 163, 1937) and Löfgren (Arkiv för Kemi, Mineralogi och Geologi, 22 A, (1946 No. 18) mention certain alkylaminoacyltoluidines that exhibit local anesthetic properties of various caliber. In these articles as well as in an article by Goldberg (Acta Physiol. Scand. 18, 1, 1949), their authors have shown, however, that such toluidine compounds, whether the methyl group is in ortho, meta, or para position, have undesirable side effects, for example, strong local irritation and often poor incidence of anesthesia, such that they cannot be used clinically.

Moreover, it is not known that any toluidine compound has actually been used clinically as a local anesthetic. Instead, it has been shown by Löfgren et al., for instance in their United States Patent No. 2,441,498, that only by introducing another methyl group onto the benzene nucleus clinically useful local anesthetics can be obtained, and then also provided that both methyl groups are in an o-position so that the compound is a 2,6-xylidide, because all other xylidides have been found to be particularly toxic and irritating.

This invention, however, surprisingly shows that some alkylaminoacyl-o-toluidines also can have clinically very valuable local anesthetic properties. These favorable properties, however, are shown only by certain specific compounds of this type, namely, alpha-monoalkylaminopropionyl-ortho-toluidides of the general formula:

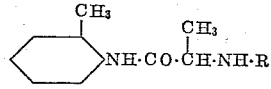

wherein R is an alkyl group having three carbon atoms, that is alpha-monoalkylamino-propionyl-ortho-toluidide, wherein the alkyl group is ethyl, n-propyl, or isopropyl. The compounds of this invention exhibit unexpectedly good local anesthetic effect in clinical use because they are completely free from side effects at all reasonable dosages; and on account of their considerably lower toxicity, they possess a very favorable therapeutic index. By this invention, therefore, a new group of local anesthetics is made available for clinical use.

A further advantage of the invention is the fact that in the preparation of these compounds o-toluidine can be used as starting material, and this substance is readily available commercially in a form sufficiently pure for medicine synthesis.

Clinical tests, for example, with alpha-n-propylaminopropionyl-ortho-toluidine show it to possess particularly favorable properties, and that this compound has definite superiority as a conduction anesthetic.

Such tests have shown that all three of the fundamental compounds of the present invention manifest very desirable anesthetic latency effect. Most surprising is that these compounds possess unexpected low toxicity, at least in man, which is actually what counts in clinical application.

The invention is illustrated, but not limited, by the following examples:

*Example 1.—Alpha-n-Propylaminopropionyl-o-Toluidide*

One mole of alpha-bromopropionyl-o-toluidide was mixed with a solution of 3 moles of n-propylamine in 500 milliliters of dry benzene, and the reaction mixture was heated in an autoclave to 80° C. for 8 hours. After cooling, the reaction mixture was diluted with one liter of absolute ether and the precipitated propylamine hydrobromide was filtered off. The ether-benzene solution was then extracted with 4 N HCl until a sample of the extract no longer showed an opacity upon addition of ammonia. The combined extracts were washed once by shaking with ether. The other extract was discarded and the aqueous phase made alkaline by adding concentrated ammonia. The liberated base was dissolved in ether. After being dried over anhydrous sodium sulfate, the ether solution was evaporated and the residue distilled under reduced pressure. The base (alpha-n-propylaminopropionyl-ortho-toluidide) was obtained as a colorless oil. B.P. 159–162° at 0.1 mm. Yield 55%.

*Example 2.—Alpha-n-Propylaminopropionyl-o-Toluidide*

One mole of alpha-bromopropionyl-o-toluidide and 2.7 moles of n-propylamine dissolved in 1 liter of dry benzene were heated in an autoclave at 80° C. for 8 hours. The reaction mixture then was cooled and thereafter diluted with 1 liter of absolute ether. After filtering, the ether was driven off over a water-bath, and the alpha-n-propylaminopropionyl-ortho-toluidide residue was distilled under reduced pressure. B.P. 164–166° at 0.3 mm. Yield 72%.

*Example 3.—Alpha-Isopropylaminopropionyl-o-Toluidide Hydrochloride*

Alpha-bromopropinoyl-o-toluidide was reacted with isopropylamine instead of propylamine, in the same way and proportions as in Example 3. After cooling the reaction mixture, it was diluted with one liter of absolute ether, and the preciptate obtained (isopropylamine hydrobromide) was filtered off. The ether-benzene solution then was treated with HCl in ether and the hydrochloride of alpha-isopropylaminopropionyl-ortho-toluidide thus obtained was recrystallized from water with the addition of a few milliliters of Hydrochloric acid, as colorless crystals of M.P. 236–237° C. Yield 75%.

*Example 4.—Alpha-n-Propylaminopropionyl-o-Toluidide*

One mole of o-tolyphosphazo-o-toluidide, i.e.

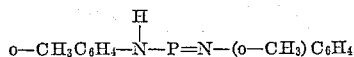

was mixed with 2 moles of alpha-n-propylamino-propionic acid hydrochloride and heated to 100–150° C. for 1 hour. After being cooled, the mixture was diluted with water and alkalinized by the addition of sodium hydroxide; and the liberated base taken up in ether. The solution was sufficiently extracted with 4 N-hydrochloric acid, and then further processed as in Example 1. Yield 85%.

*Example 5.—Alpha-Isopropylaminopropionyl-o-Toluidide Hydrochloride*

One mole of o-toluididine and 1.5 moles of alpha-isopropylaminopropionic acid hydrochloride were mixed intimately. A crystal mass was formed with liberation of heat. The reaction mixture then was treated with 0.25 mole of $P_2O_5$, and heated on a water-bath for 15 minutes. It was then diluted with 1 liter of water and made alkaline by the addition of 4 N sodium hydroxide. The toluidide thus liberated was extracted with ether, and the ether solution dried over anhydrous $Na_2SO_4$. Upon blowing in gaseous HCl, the corresponding alpha-isopropylaminopropionyl-ortho-toluidide hydrochloride was precipitated out and then purified by recrystallization. Yield 70%.

*Example 6.—Alpha-Isopropylaminopropionyl-o-Toluidide Hydrochloride*

1 mole of the sodium salt of alpha-(N-carbobenzoxyisopropylamino) propionic acid was pulverized and suspended in dry benzene, whereupon 1 mole of benzoyl chloride was added, and the mixture stirred for 2.5 hours at room temperature. Then 1 mole of o-toluidine and 1 mole of triethylamine were added. The stirring was continued for 2 hours at room temperature and for that same time at 100°. After cooling, the benzene phase was extracted with water and then dried over anhydrous sodium sulphate. Palladium cataylst was added to the benzene solution and hydrogen fed in at room temperature and at a pressure of 3 atmospheres. The solution so obtained was filtered, and the hydrochloride precipitated by addition of hydrochloric acid in ether. The alpha-isopropylaminopropionyl - ortho - toluidide hydrochloride formed was filtered off and recrystallized from water containing a little of hydrochloric acid. Yield 70%.

*Example 7.—Alpha-n-Propylaminopropionyl-o-Toluidide*

1 mole of the ethyl ester of alpha-n-propylaminopropionic acid and 1 mole of o-toluidine were dissolved in 1 liter of dry benzene. 1 mole of sodium amide was added in portions, under stirring. After this addition, the reaction mixture was left 1 hour at room temperature under continued stirring, and then it was heated under reflux. After cooling, the reaction mixture was processed by the procedure according to Example 1. Yield 55% of alpan-propylaminopropionyl-ortho-toluidide.

The free base, alpha-isopropylaminopropionyl - ortho-toluidine, was obtained from its hydrochloride of Examples 3, 5 and 6, by the same method used in the latter part of the second paragraph of Example 1 for liberating its free base from the combined 4-normal hydrochloric acid extracts by making that acid extract solution alkaline with concentrated ammonium hydroxide; then dissolving the liberated base in sufficient ether, drying the resulting ether solution over anyhdrous sodium sulfate, and heating the dried ether solution over a water-bath to evaporate off the ether. The residue, being the free base desired, is best distilled under reduced pressure to have it in purified form.

The corresponding hydrohalide of the free base toluidide of Example 1 is obtained in the same way as the specific end product hydrochloride was obtained in Example 3; that is to say, by taking the ether-benzene solution obtained by adding the liter of absolute ether to the autoclave reaction product and treating that solution with ether containing the hydrogen halide, the acid addition salt of which is to be prepared, for example, hydrogen chloride in ether (with the HCl in an amount just about slightly in excess of that required to convert the free base toluidide to its hydrochloride).

The resulting alpha - n - propylaminopropionyl-ortho-toluidide hydrochloride thus prepared is separated from the ether-benzene solution by being taken up and dissolved in hot water containing a few milliliters of hydrchloric acid, and crystallized from that water solution (after sufficient concentration therein), and recrystallized from hot water likewise containing a few milliliters of the acid.

By treating the ether-benzene solution obtained after the autoclave step in Example 1 similarly with HCl in ether and following the procedure described immediately above, there is obtained similarly aplha-n-propylaminopropionyl-ortho-toluidide hydrochloride.

By replacing the HCl in the ether in the foregoing preparations of those two hydrchlorides, and also in Example 3, by hydrogen bromide there is prepared similarly the corresponding alpha - ethylaminopropionyl - ortho-toluidide hydrobromide, alpha-isopropylamino-propionyl-ortho-toluidide hydrobromide, and alpha-n-propylaminopropionyl-ortho-toluidide hydrobromide.

Others of the therapeutically innocuous acid addition salts are similarly prepared by replacing the hydrogen halide in the foregoing preparations of the hydrohalides by the respective equivalent amount of citric acid, glycolic acid, lactic acid, levulinic acid, or succinic acid. Thereby, there is obtained the corresponding citrate, glycolate, lactate, levulinate, and succinate of each of these three different alpha - mono(lower)alkylaminopropionyl-ortho-toluidides respectively.

Alternatively, still other therapeutically innocuous acid addition salts are prepared by treating the ether-benzene solution of the particular toluidide free base obtained after the autoclave step, with the respective equivalent amount of the desired acid in ether, or ether-ethanol mixture, or in ethanol, for example, glacial acetic acid, fumaric acid, maleic acid, phosphoric acid, or tartaric acid, whereby there are similarly obtained the corresponding acetate, fumarate, maleate, phosphate, and tartrate respectively of each of these three different alpha-mono(lower)alkylaminopropionyl-ortho-toluidides respectively.

Included as part of the invention also is the method of making these toluidides broadly by the procedures illustrated, but not restricted to, the foregoing complete specific examples.

While the invention has been explained by giving complete description of various specific embodiments of it, it is understood that various modifications and substitutions can be made in any of those examples within the scope of the appended claims which cover also equivalents of the various specific embodiments.

What is claimed is:

1. A substance of the class consisting of alpha-(lower)-monoalkylaminopropionyl - ortho - toluidide wherein the alkyl group has three carbon atoms and a pharmaceutically acceptable acid addition salt of said toluidide.
2. Alpha-n-propylaminopropionyl-ortho-toluidide.
3. A pharmaceutically acceptable acid addition salt of alpha-n-propylaminopropionyl-ortho toluidide.
4. A pharmaceutically acceptable hydrohalide of alpha-n-propylaminopropionyl-ortho-toluidide.
5. Alpha - n - propylaminopropionyl-ortho-toluidide hydrochloride.
6. Alpha-isopropylaminopropionyl-ortho toluidide.

7. A pharmaceutically acceptable acid addition salt of alpha-isopropylaminopropionyl-ortho-toluidide.

8. A pharmaceutically acceptable hydrohalide of alpha-isopropylaminopropionyl-ortho-toluidide.

9. Alpha-isopropylaminopropionyl-ortho-toluidide hydrochloride.

References Cited in the file of this patent

UNITED STATES PATENTS

| 2,441,498 | Lofgren | May 11, 1948 |
| 2,794,835 | Lofgren | June 4, 1957 |
| 2,823,209 | Martin | Feb. 11, 1958 |

FOREIGN PATENTS

| 183,076 | Austria | Sept. 10, 1955 |
| 726,864 | Great Britain | Mar. 23, 1955 |
| 741,113 | Great Britain | Nov. 23, 1955 |

OTHER REFERENCES

Svensk Kemisk Tidskrift 49 (1937), page 172.
Svensk Kemisk Tidskrift, vol. 58, 1946, pages 213–14.
Lofgren Arkiv for Kemi Mineralogi och Geologi Bd 22 A, No. 18 (1946), pages 5 to 7.